US009057867B2

(12) United States Patent
Kumagai

(10) Patent No.: US 9,057,867 B2
(45) Date of Patent: Jun. 16, 2015

(54) MIRROR AND REFLECTIVE DEVICE FOR GENERATING SOLAR POWER

(75) Inventor: Takenori Kumagai, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 26 days.

(21) Appl. No.: 14/003,323

(22) PCT Filed: Mar. 28, 2012

(86) PCT No.: PCT/JP2012/058107
§ 371 (c)(1),
(2), (4) Date: Sep. 5, 2013

(87) PCT Pub. No.: WO2012/133517
PCT Pub. Date: Oct. 4, 2012

(65) Prior Publication Data
US 2013/0335840 A1 Dec. 19, 2013

(30) Foreign Application Priority Data
Mar. 31, 2011 (JP) ................................ 2011-077391

(51) Int. Cl.
| | |
|---|---|
| *G02B 1/10* | (2006.01) |
| *G02B 19/00* | (2006.01) |
| *C09D 4/06* | (2006.01) |
| *G02B 5/08* | (2006.01) |
| *C09D 183/04* | (2006.01) |
| *C08F 222/10* | (2006.01) |
| *C08F 230/08* | (2006.01) |
| *C08G 77/20* | (2006.01) |

(52) U.S. Cl.
CPC .............. *G02B 19/0042* (2013.01); *C09D 4/06* (2013.01); *G02B 1/105* (2013.01); *G02B 5/0808* (2013.01); *C09D 183/04* (2013.01); *C08G 77/20* (2013.01); *C08F 222/1006* (2013.01); *C08F 230/08* (2013.01)

(58) Field of Classification Search
CPC ........... G02B 19/0042; G02B 5/10; F24J 2/14
USPC .................. 359/838, 870, 883, 884; 427/515; 60/641.1, 641.8, 641.15
See application file for complete search history.

(56) References Cited

U.S. PATENT DOCUMENTS

| | | | |
|---|---|---|---|
| 4,645,714 A | * 2/1987 | Roche et al. .................. | 428/458 |
| 2007/0048531 A1 | * 3/2007 | Nagaoka et al. ............... | 428/447 |
| 2011/0014483 A1 | * 1/2011 | Okazaki ........................ | 428/447 |

FOREIGN PATENT DOCUMENTS

| | | | |
|---|---|---|---|
| JP | 61-154942 A | | 7/1986 |
| JP | 62-79265 A | | 4/1987 |

(Continued)

OTHER PUBLICATIONS

International Search Report of PCT/JP2012/058107 dated Jul. 3, 2012.

(Continued)

*Primary Examiner* — Scott J Sugarman
*Assistant Examiner* — William R Alexander
(74) *Attorney, Agent, or Firm* — Lucas & Mercanti, LLP

(57) ABSTRACT

A hard coat layer 8 is provided on an outermost surface layer of a film mirror 10 having a first resin base material 1 and a silver reflection layer 3, and the hard coat layer 8 contains a polyfunctional acrylic monomer and a silicon resin having an active energy ray reactive unsaturated group.

14 Claims, 2 Drawing Sheets

(56) References Cited

FOREIGN PATENT DOCUMENTS

| | | |
|---|---|---|
| JP | 10-310740 A | 11/1998 |
| JP | 2005-036018 A | 2/2005 |
| JP | 2009-084436 A | 4/2009 |
| JP | 2009-520174 A | 5/2009 |
| WO | WO 2010/106844 A1 | 9/2010 |

OTHER PUBLICATIONS

Gilbert E. Cohen et al; Final Report on the Operation and Maintenance Improvement Program for Concentrating Solar Power Plants; SAND99-1290; Jun. 1999.

PCT International Preliminary Report on Patentability, International Application No. PCT/JP2012/058107, International filing date Mar. 28, 2012 (9 pages). Date of issuance: Oct. 1, 2013.

* cited by examiner

US 9,057,867 B2

MIRROR AND REFLECTIVE DEVICE FOR GENERATING SOLAR POWER

CROSS-REFERENCE TO RELATED APPLICATIONS

This application is a 371 of PCT/JP2012/058107 filed on Mar. 28, 2012, which claims the priority of Japanese Application Serial No. 2011-077391 filed on Mar. 31, 2011, the contents of each of which are incorporated herein by reference.

TECHNICAL FIELD

The present invention relates to a mirror and a reflection device for generating solar power.

BACKGROUND ART

Recently, utilization of natural energy as alternative energy of fossil fuel energy such as oil and natural gas has been studied. Particularly, solar energy having large quantity of energy has attracted attention because it is most stable as the alternative energy of the fossil fuel energy. However, although the solar energy is a very effective alternative energy, in terms of utilizing the solar energy, it is considered that there is a problem in that (1) the energy density of the solar energy is low and (2) it is difficult to store and transfer the solar energy.

Presently, a solar cell is actively studied and developed, and utilization efficiency of the sunlight is becoming increased; however, achievement of sufficient recovery efficiency cannot yet be realized at present.

As an alternative method of converting sunlight to energy, solar power generation in which the sunlight is collected using a mirror and power generation is performed using heat, obtained from sunlight, as a medium has attracted attention. By virtue of the use of this method, power generation can be performed at any time during the day or night, and moreover, since in the long run it is considered that the power generation efficiency will be higher than that of a solar cell, the sunlight can be effectively used.

Since a solar power generation plant is often constructed in a desert region, dusts are adhered onto a mirror surface to reduce the reflectance of the mirror. Consequently, since the generating efficiency is reduced, soil of the mirror is recognized as a big problem. In fact, in a solar power generation plant in California, it has been observed that the reflectance of the mirror is reduced by not less than 20% per month. Moreover, it has been reported that reduction in the reflectance of the mirror by 1% incurs a loss of $185,000/year. Although the mirror is cleaned by being sprayed with ion-exchange water at a frequency of approximately once per two weeks to two months at present, if a cleaning cost per one cleaning is approximately \$0.01/m$^2$, when the mirror in the entire plant is cleaned, such an enormous cost as \$1,000 to \$20,000 is required. In addition to this, in order to scrub the mirror with a brush several times per year, the mirror is required to have surface hardness (see, Non-Patent Literature 1). Namely, as the current problem of a film mirror, it is required to form an antifouling hard coat layer on the outermost surface having three functions including antifouling property, scratch resistance, and weather resistance.

Thus, the present inventor has searched the cause of adhesion of dirt in the desert. It was found that the dirt in the desert is different from normal dirt and forms a strong sand coat. It is considered that this is because a large amount of sand is piled on a mirror surface, dew condensation generated resulting from a large temperature difference between morning and night is adhered onto the mirror surface, and sand particles are coagulated with each other in the condensation to react with contaminants in the atmosphere and, thus, to generate insoluble salt, whereby the sand coat is formed. From this result, it can be seen that the moisture content is significantly involved in the adhesion of dirt. If an amount of the moisture content adhered onto the mirror surface can be reduced as small as possible, the adhesion of dirt can be prevented, and a high reflectance can be maintained over a long period of time.

As a method of reducing the adhesion of water droplets on a mirror surface, there is a method of increasing a contact angle (increasing water repellency) with the use of a fluororesin or the like and reducing adhesion of water droplets. However, as a result of diligent studies by the present inventor, it was found that it is more effective for antifouling of the mirror in the desert to reduce a falling angle, which is an angle at which water droplet is rolled down, rather than to increase the contact angle of a film surface of the mirror.

Although Patent Literature 1 reports a film mirror for solar power generation, since an acrylic layer having a relatively low hardness is just provided on the outermost surface layer of the film mirror, the film mirror is configured to be easily damaged and soiled.

Patent Literatures 2 and 3 propose a hard coat excellent in durability, antifouling property, and scratch resistance, which is obtained by curing a resin containing a fluorine component and a silicon component with an active energy ray. However, the Patent Literatures 2 and 3 do not describe the fact that those hard coats are used in a film mirror used outdoors. Moreover, there is no such device that the durability is enhanced for use outdoors, and there is no mention of the falling angle. Therefore, those skilled in the art focusing attention to the falling angle cannot usually devise the application of the techniques of the Patent Literatures 2 and 3.

CITATION LIST

Patent Literature

Patent Literature 1: Japanese Unexamined Patent Application Publication No. 2009-520174
Patent Literature 2: Japanese Patent Laid-Open Publication No. 2009-84436
Patent Literature 3: Japanese Patent Laid-Open Publication No. 2005-36018

Non-Patent Literatures

Non-Patent Literature 1: Final report on the operation and maintenance improvement program for concentrating solar power plants. Printed June 1999, Gilbert E. Cohen, David W. Kearney, Gregory J. Kolb

SUMMARY OF INVENTION

Technical Problem

When a mirror for solar power generation is installed for a long period of time in an environment like the desert where a mirror surface is significantly soiled by sand and little rain falls, a regular reflectance of the mirror is decreased. In such a case, although the regular reflectance is partially recovered by rinsing off soils with a brush and so on, the mirror surface is damaged by cleaning, so that the regular reflectance is decreased in comparison with the initial state. Thus, a mirror for solar power generation preferably has effective antifouling property and scratch resistance.

However, the antifouling property and the scratch resistance based on the perspective of the falling angle are performances required not only for the mirror for solar power generation but are applicable to other mirrors used outdoors; therefore, another object of the present invention is to provide a general mirror having good antifouling property and scratch resistance.

The present invention provides a mirror for solar power generation, which is excellent in antifouling property and scratch resistance and has a high level of such weather resistance that a good regular reflectance to sunlight can be maintained for a long period of time even when installed in a severe environment for a long period of time, and a reflection device for solar power generation using the mirror.

Means to Solve the Problem

The above object of the present invention is achieved by the following configuration.

Specifically, according to one aspect of the invention, a mirror includes a base material and a silver reflection layer. A hard coat layer is provided at an outermost surface layer of the mirror and the hard coat layer contains a polyfunctional acrylic monomer and a silicon resin.

The polyfunctional acrylic monomer preferably has an active energy ray reactive unsaturated group.

In general, a polyfunctional acrylic monomer, particularly which has an active energy ray reactive unsaturated group, is a resin easily deteriorated by ultraviolet light. On the other hand, a silicon resin is highly durable since the silicone resin has a high binding force between atoms constituting the resin and is not decomposed under irradiation with ultraviolet light. Thus, a hard coat layer relatively highly resistant to ultraviolet light could be developed by containing a silicon component as a resin even when an active energy ray reactive unsaturated group is remained. Moreover, the present inventor focused attention on the fact that antifouling property obtained by the silicon component was expressed and the falling angle was reduced. Namely, the present invention can provide a mirror in which water droplets are less prone to be adhered onto a surface of the mirror and, because of this, the antifouling performance is improved. Namely, by virtue of the use of a hard coat layer of the present invention, an outermost surface layer having three functions including antifouling property, weather resistance, and scratch resistance can be formed. Such a mirror is particularly preferable as a mirror used outdoors, for example, such as a mirror for solar power generation.

It is preferable that the base material is a resin base material, and the mirror is a film mirror.

It is preferable that a resin material containing the polyfunctional acrylic monomer and the silicon resin is a resin material in which at least polyfunctional acrylate and/or polyfunctional methacrylate and polyorganosiloxane chain are cross-linked.

In the formation of a hard coat layer, although a curing method using an active energy ray is an environmentally-friendly technique and excellent in productivity, since the hard coat layer easily reacts with ultraviolet light as a kind of an active energy ray, a resin itself is decomposed by ultraviolet light, and the hard coat property is rapidly reduced by outdoor exposure for a long period of time. Thus, as a result of intensive studies by the present inventor in order to satisfy the above three functions, it was found that an antifouling hard coat layer having high scratch resistance, a low falling angle, and high weather resistance can be formed by using a polyfunctional acrylate and/or polyfunctional methacrylate (preferred is one having an active energy ray curable unsaturated bond) and a monomer having a polyorganosiloxane chain (preferred is one having a radical polymerizable double bond) for a hard coat resin. When a base material is glass, it is possible to obtain such an effect that if glass as a base material is broken, scattering of pieces of glass can be prevented by the hard coat layer. Moreover, according to the hard coat layer of the present invention, it is possible to obtain such an effect that the hard coat layer has a low electrical resistance and an antistatic function. Thus, since adhesion of dust due to static electricity can be prevented, a high antifouling effect can be obtained in that respect.

Preferably, the hard coat layer contains an ultraviolet absorbent.

The weather resistance is improved by adding an ultraviolet absorbent in the hard coat layer.

Preferably, the ultraviolet absorbent is a benzotriazole-based ultraviolet absorbent. The benzotriazole-based ultraviolet absorbent is a compound represented by a following general formula (1).

[Chemical Formula 1]

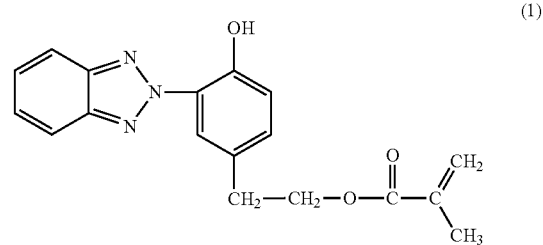

By virtue of the addition of the benzotriazole-based ultraviolet absorbent in the hard coat layer, damage on a base material and so on in a mirror due to ultraviolet light can be reduced as small as possible, and the weather resistance can be further improved. In addition, as an extraordinary effect, the inventor has found that the falling angle can be further reduced by adding the benzotriazole-based ultraviolet absorbent to the hard coat layer (particularly, a resin in which polyfunctional acrylate and polyfunctional methacrylate having active energy ray curable unsaturated bond and a polyorganosiloxane chain are cross-linked). Namely, according to the feature, the weather resistance can be further improved.

Preferably, an organic-based antioxidant is contained in the hard coat layer.

An antioxidant which is a radical trap agent suppressing radicals promoting deterioration of a resin is added into the hard coat layer, whereby the weather resistance can be improved. Additionally, the falling angle can be further reduced.

Preferably, the hard coat layer contains polyorganosiloxane, whereby the scratch resistance can be further improved.

Preferably, an ultraviolet absorption layer is provided among layer(s) between the hard coat layer and the silver reflection layer.

Preferably, a gas barrier layer is provided in a layer among layer(s) between the hard coat layer and the silver reflection layer.

Preferably, an anti-corrosion layer is provided on a light incident side relative to the silver reflection layer.

The anti-corrosion layer preferably contains a silver-adsorptive anti-corrosion inhibitor (anti-corrosion inhibitor having an adsorptive group for silver). It is preferable that an ultraviolet absorption layer is provided on the light incident side of the anti-corrosion layer, or any one of component layers provided on the light incident side of the silver reflection layer contains an ultraviolet absorbent.

Similarly, it is preferable that any one of component layers provided on the light incident side of the silver reflection layer contains an antioxidant. Further, it is preferable that any one of component layers provided on the light incident side of the silver reflection layer has a gas barrier layer.

Preferably, at least two types of radical initiators are used as initiators of the hard coat layer, and the two types of radical initiators are radical initiators which absorb different wavelengths each other.

For example, when only an initiator absorbing a shorter wavelength is used, the reaction is insufficient, and the initiator may remain. Meanwhile, when only an initiator absorbing a longer wavelength is used, although reactivity is improved, the initiator may be colored during long-term use. Thus, it is preferable to use radical initiators which are not colored during long-term use and absorb different wavelengths in order to improve the reactivity.

The mirror of the present invention can be used as a mirror for solar power generation.

Another aspect of the present invention is a reflection device for solar power generation. In the reflection device for solar power generation, the mirror is bonded to a support base material through a sticky layer.

Advantageous Effects of Invention

The present invention can provide a mirror for solar power generation which is excellent in scratch resistance and antifouling property and has a high level of such weather resistance that a good regular reflectance to sunlight can be maintained for a long period of time even when installed in a severe environment for a long period of time, and a reflection device for solar power generation using the mirror.

DESCRIPTION OF EMBODIMENTS

Figure 1A:
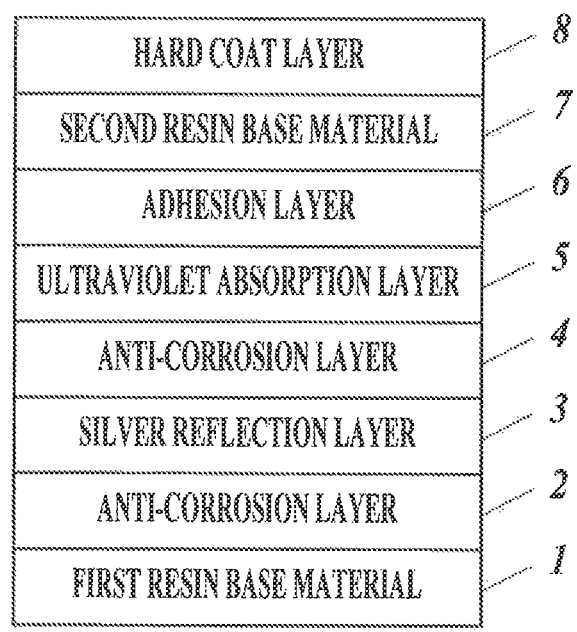
FIG. 1A is a schematic cross-sectional view showing an example of a configuration of a film mirror for solar power generation of the present invention.

A mirror according to one aspect of the present invention is a mirror having a base material and a silver reflection layer and a hard coat layer provided on the outermost surface layer contains a polyfunctional acrylic monomer and a silicon resin.

Such a structural feature is a main technical feature common to the present invention. When the mirror is a film mirror for solar power generation, it is preferable because the film mirror can maximally bring the effect of the present invention. However, the mirror of the present invention is not limited to the film mirror and any mirrors which can be used outdoors can bring the effect of the present invention.

A base material may be either resin or glass. When resin or glass having a small thickness of not less than 10 μm and not more than 300 μm is used as the base material, a film mirror is provided and when resin or glass as the base material having a thickness of more than 300 μm is used as the base material, a rigid mirror is provided.

The film mirror for solar power generation has forms of a back surface mirror and a front surface mirror. The back surface mirror has such a form that a base material of not less than 10 μm is provided between the sunlight incident side and a silver reflection layer and the front surface mirror has such a form that the base material of not less than 10 μm is not provided between the sunlight incident side and the silver reflection layer. The base material is preferably formed of a resin and may be formed of thin glass.

Hereinafter, regarding the mirror according to the present invention, particularly a film mirror for solar power generation will be described in detail. Although various limitations that are technically preferable for carrying out the present invention are imposed on the embodiments described below, the scope of the present invention is not limited to the following embodiments and illustrated examples.

(1) Summary of Configuration of Film Mirror for Solar Power Generation

A summary of a film mirror which is a mirror for solar power generation of the present invention will be described.

The film mirror for solar power generation has at least a base material and a silver reflection layer. Further, the outermost surface layer of the mirror has a hard coat layer. Furthermore, an ultraviolet absorption layer may be provided between the hard coat layer and the silver reflection layer as necessary. Furthermore, a gas barrier layer may be provided between the hard coat layer and the silver reflection layer. Furthermore, an anti-corrosion layer may be provided on a light incident side relative to the silver reflection layer. Furthermore, a primer layer may be provided on the opposite side of the light incident side of the hard coat layer. Other layers such as an adhesion layer, a sticky layer and a release layer may be provided. The entire thickness of the film mirror for solar power generation is preferably 75 to 250 μm, more preferably, 90 to 230 μm, still more preferably 100 to 220 μm, in terms of prevention of deflection of the mirror, regular reflectance, and handleability.

An example of a preferred layer configuration of the film mirror for solar power generation having the above thickness will be explained using FIG. 1A. And a summary of a reflection device for solar power generation will be explained using FIG. 1B.

As shown in FIG. 1A, a film mirror 10 is provided with a silver reflection layer 3 provided on a first resin base material 1 as a base material and a hard coat layer 8 is provided on an outermost surface layer of the mirror. An anti-corrosion layer 4, an ultraviolet absorption layer 5, an adhesion layer 6, and a second resin base material 7 as component layers are provided above the silver reflection layer 3 and between the silver reflection layer 3 and the hard coat layer 8. An anti-corrosion layer 2 is provided between the first resin base material 1 and the silver reflection layer 3.

Figure 1B:
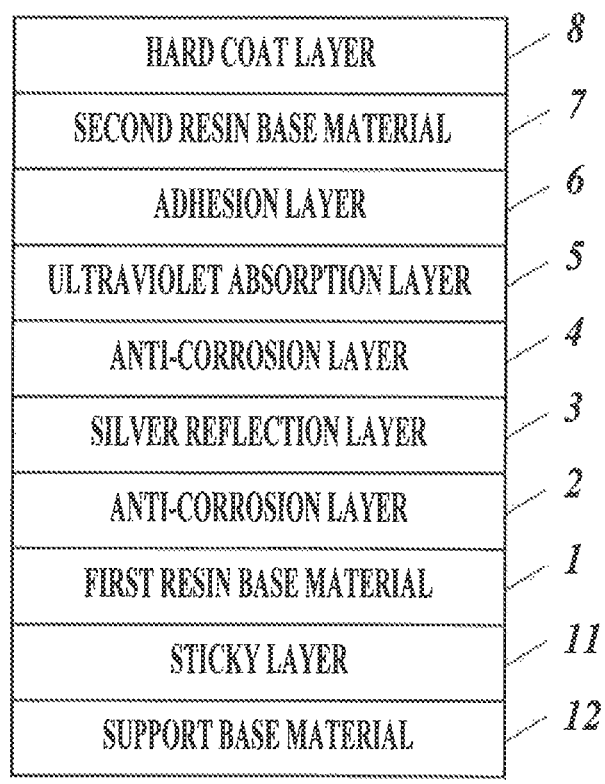
FIG. 1B is a schematic cross-sectional view showing an example of configuration of a reflection device for solar power generation of the present invention.

As shown in FIG. 1B, a reflection device 20 for solar power generation is a reflecting mirror configured by applying the first resin base material 1 side of the film mirror 10 to a support base material 12 through a sticky layer 11.

Hereinafter, details of each layer configuration will be described.

(2) Base Material

A base material may be formed of resin or glass. As a film mirror, the thickness of the base material is preferably within a range of 10 to 300 μm, more preferably 20 to 200 μm, and still more preferably 30 to 100 μm.

When a resin is used as the base material, the first resin base material may be provided at a position far from the light incident side relative to the silver reflection layer and the second resin base material may be provided at a position close to the light incident side relative to the silver reflection layer.

As the first resin base material, conventionally well-known various resin films may be used. Examples of the first resin base material include a cellulose ester based film, a polyester-based film, a polycarbonate-based film, a polyallylate-based film, a polysulfone (including polyethersulfone) based film, a polyester film such as polyethylene terephthalate and polyethylene naphthalate, a polyethylene film, a polypropylene film, cellophane, a cellulose diacetate film, a cellulose triacetate film, a cellulose acetate propionate film, a cellulose acetate butyrate film, a polyvinylidene chloride film, a polyvinyl alcohol film, an ethylene vinyl alcohol film, a cyndioctatic polystyrene-based film, a polycarbonate film, a norbornene based resin film, a polymethylpentene film, a polyether ketone film, a polyether ketoneimide film, a polyamide film, a fluorine resin film, a nylon film, a polymethyl methacrylate film, and an acryl film. Among those resin films, a polycarbonate-based film, a polyester-based film, a norbornene-based resin film, a cellulose ester-based film, and an acryl film are preferred.

Particularly, a polyester-based film and an acryl film are preferably used, and both a film produced by a melt casting film forming method and a film produced by a solution casting film forming method may be used.

Since the first resin base material is provided at the position far away from the light incident side relative to the silver reflection layer, ultraviolet light is less likely to reach the first resin base material. Especially when an ultraviolet absorbent is contained in a layer on the light incident side relative to the first resin base material or when an ultraviolet absorption layer is provided, ultraviolet light is further less likely to reach the first resin base material. Accordingly, even if the first resin base material may be a resin easily deteriorated by ultraviolet light in comparison with the second resin base material, the first resin base material is usable. From such a standpoint, a polyester film such as polyethylene terephthalate is usable as the first resin base material.

It is preferable that the thickness of the first resin base material is a suitable thickness according to the type, purposes and the like of a resin. For example, the thickness is generally within a range of 10 to 300 μm and preferably 20 to 200 μm.

Meanwhile, as the second resin base material provided on the light incident side relative to the first resin base material, although a resin similar to the above may be used, an acrylic film which is tough against ultraviolet light is preferably used since the second resin base material is located at a position where the second resin base material is more prone to be affected by ultraviolet light. Since the second resin base material is provided on the light incident side relative to the silver reflection layer, it is preferable that the second resin base material is formed of a material having optical transparency.

It is preferable that the thickness of the second resin base material is a suitable thickness according to the type, purposes and the like of a resin. However, since the second resin base material is provided on the light incident side relative to the first resin base material, it is preferable that it is thicker than the second resin base material in order to prevent transmission of ultraviolet light or the like. For example, the thickness is generally within a range of 30 to 300 μm, preferably 50 to 200 μm. The second resin base material may contain an ultraviolet absorbent and thereby may serve as an ultraviolet absorption layer.

(3) Anti-Corrosion Layer

An anti-corrosion layer is a layer preventing corrosion of silver. Accordingly, it is preferable that the anti-corrosion layer is provided adjacent to the silver reflection layer. It is particularly preferable that the anti-corrosion layer is adjacent to the light incident side of the silver reflection layer. As in the examples shown in FIGS. 1A and 1B, the anti-corrosion layers may be adjacent to both sides of the silver reflection layer.

The anti-corrosion layer contains a corrosion inhibitor and particularly contains a corrosion inhibitor against silver contained in the silver reflection layer. The corrosion inhibitor preferably has an adsorptive group for silver. The "corrosion" is referred to as a phenomenon where metal (silver) is chemically or electrochemically eroded or materially deteriorated by environmental materials surrounding the metal (silver) (see JIS Z0103-2004).

In the anti-corrosion layer, a resin can be used as a binder. Examples of the resins include a cellulose ester-based resin, a polyester-based resin, a polycarbonate-based resin, a polyallylate-based film, a polysulfone (including polyethersulfone) based resin, a polyester resin such as polyethylene terephthalate and polyethylene naphthalate, a polyethylene resin, a polypropylene resin, cellophane, a cellulose diacetate resin, a cellulose triacetate resin, a cellulose acetate propionate resin, a cellulose acetate butyrate resin, a polyvinylidene chloride resin, a polyvinyl alcohol resin, an ethylene vinyl alcohol resin, a cyndioctatic polystyrene-based resin, a polycarbonate resin, a norbornene-based resin, a polymethylpentene resin, a polyether ketone resin, a polyether ketoneimide resin, a polyamide resin, a fluorine resin, a nylon resin, a polymethyl methacrylate resin, and an acrylic resin. Among those resins, an acrylic resin is preferred. The thickness of the anti-corrosion layer is preferably not less than 30 nm and not more than 1 μm.

Although an optimum content of the corrosion inhibitor varies depending on a compound to be used, the content of the corrosion inhibitor is generally preferably within a range of 0.1 to 1.0/m2.

Next, details of the corrosion inhibitor will be described.

(3-1) Corrosion Inhibitor

The corrosion inhibitor having the adsorptive group for silver is preferably at least one kind of or a mixture of two or more kinds selected from amines and derivatives thereof, a compound having a pyrrole ring, a compound having a triazole ring, a compound having a pirazole ring, a compound having a thiazole ring, a compound having an imidazole ring, a compound having an indazole, copper chelate compounds, thioureas, a compound having a mercapto group, and a naphthalene-based compound. A silicon-modified resin may be used and is not limited particularly.

Examples of amines and derivatives thereof include ethyl amine, lauryl amine, tri-n-butyl amine, o-toluidine, diphenyl amine, ethylene diamine, diethylene triamine, triethylene tetramine, tetraethylene pentamine, monoethanol amine, diethanol amine, triethanol amine, 2N-dimethylethanol amine, 2-amino-2-methyl-1,3-propane diol, acetoamide, acrylamide, benzamide, p-ethoxychrysoidine, dicyclohexyl ammonium nitrite, dicyclohexyl ammonium salicylate, monoethanol amine benzoate, dicyclohexyl ammonium benzoate, diisopropyl ammonium benzoate, diisopropyl ammonium nitrite, cyclohexyl amine carbamate, nitronaphthalene ammonium nitrite, cyclohexyl amine benzoate, dicyclohexyl ammonium cyclohexane carboxylate, cyclohexyl amine cyclohexane carboxylate, dicyclohexyl ammonium acrylate, and cyclohexyl amine acrylate, and mixtures thereof.

Examples of compounds each having a pyrrole ring include N-butyl-2,5-dimethyl pyrrole, N-phenyl-2,5-dimethyl pirrole, N-phenyl-3-formyl-2,5-dimethyl pirrole, and N-phenyl-3,4-diformyl-2,5-dimethyl pirrole, and mixtures thereof.

Examples of compounds each having a triazole ring include 1,2,3-triazole, 1,2,4-triazole, 3-mercapto-1,2,4-triazole, 3-hydroxy-1,2,4-triazole, 3-methyl-1,2,4-triazole, 1-methyl-1,2,4-triazole, 1-methyl-3-mercapto-1,2,4-triazole, 4-methyl-1,2,3-triazole, benzotriazole, tlyltriazole, 1-hydroxy benzotriazole, 4,5,6,7-tetrahydrotriazole, 3-amino-1,2,4-triazole, 3-amino-5-methyl-1,2,4-triazole, carboxybenzotriazole, 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, and 2-(2'-hydroxy-4-octoxyphenyl)benzotriazole, and mixtures thereof.

Examples of compounds each having a pyrazole ring include pyrazole, pyrazoline, pyrazolone, pyrazolidine, pyrazolidone, 3,5-dimethylpyrazole, 3-methyl-5-hydroxypyrazole, 4-aminopyrazole, and mixtures thereof.

Examples of compounds each having a thiazole ring include thiazole, thiazoline, thiazolone, thiazolidine, thiazolodone, isothiazole, benzothiazole, 2-N,N-diethylthiobenzothiazole, p-dimethylaminobenzalrhodanine, 2-mercaptobenzothiazole, and mixtures thereof.

Examples of compounds each having an imidazole ring include imidazole, histidine, 2-heptadecylimidazole, 2-methylimidazole, 2-ethyl-4-methylimidazole, 2-phenylimidazole, 2-undecylimidazole, 1-benzyl-2-methylimidazole, 2-phenyl-4-methylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 2-phenyl-4-methyl-5-hydromethylimidazole, 2-phenyl-4,5-dihydroymethylimidazole, 4-formylimidazole, 2-methyl-4-formylimidazole, 2-phenyl-4-formylimidazole, 4-methyl-5-formylimidazole, 2-ethyl-4-methyl-5-formylimidazole, 2-phenyl-4-methyl-4-formylimidazole, 2-mercaptobenzoimidazole, and mixtures thereof.

Examples of compounds each having an indazole ring include 4-chloroindazole, 4-nitroindazole, 5-nitroindazole, 4-chloro-5-nitroindazole, and mixtures thereof.

Examples of copper chelate compounds include copper acetylacetone, copper ethylenediamine, copper phthalocyanine, copper ethylenediamine tetraacetate, copper hydroxyquinoline, and mixtures thereof.

Examples of thioureas include thiourea, guanylthiourea and a mixture thereof.

Examples of a compound having a mercapto group include, when the above materials are included, mercaptoacetic acid, thiophenol, 1,2-ethanedithiol, 3-mercapto-1,2,4-triazole, 1-methyl-3-mercapto-1,2,4-triazole, 2-mercaptobenzothiazole, 2-mercaptobenzoimidazole, glycol dimercaptoacetate, 3-mercaptopropyltrimethoxysilane, and mixtures thereof.

Examples of a naphthalene-based compound include thionalide.

(4) Silver Reflection Layer

A silver reflection layer is a layer mainly composed of silver having an excellent function of reflecting sunlight. The surface reflectance of the silver reflection layer is preferably not less than 80%, more preferably not less than 90%.

As a method of forming the silver reflection layer, a wet method and a dry method may be used.

The wet method is a general term of a plating method and is a method of depositing metal from solution and forming a film. A specific example of the wet method includes silver mirror reaction.

Meanwhile, the dry method is a general term of a vacuum film forming method, and specific examples thereof include a resistance heating type vacuum vapor deposition method, an electron-beam heating type vacuum deposition method, an ion plating method, an ion beam-assisted vacuum vapor deposition method, and a sputtering method. Particularly, a deposition method capable of employing a roll-to-roll method for continuously forming a film is preferably used in the present invention. For example, a method for manufacturing a film mirror for solar power generation is preferably a manufacturing method of forming a silver reflection layer by silver deposition.

The thickness of the silver reflection layer is preferably 10 to 200 nm, more preferably 30 to 150 nm in terms of the reflectance and the like.

(5) Ultraviolet Absorption Layer

An ultraviolet absorption layer is a layer containing an ultraviolet absorbent for the purpose of preventing deterioration of a film mirror due to sunlight and ultraviolet light. It is preferable that the ultraviolet absorption layer is provided on the light incident side relative to the first resin base material. When an anti-corrosion layer is provided, it is preferable that the ultraviolet absorption layer is provided on the light incident side relative to the anti-corrosion layer.

In the ultraviolet absorption layer, a resin can be used as a binder. Examples of the resins include a cellulose ester-based resin, a polyester-based resin, a polycarbonate-based resin, a polyallylate-based film, a polysulfone (including polyethersulfone)-based resin, a polyester resin such as polyethylene terephthalate and polyethylene naphthalate, a polyethylene resin, a polypropylene resin, a cellophane resin, a cellulose diacetate resin, a cellulose triacetate resin, a cellulose acetate propionate resin, a cellulose acetate butyrate resin, a polyvinylidene chloride resin, a polyvinyl alcohol resin, an ethylene vinyl alcohol resin, a cyndioctatic polystyrene-based resin, a polycarbonate resin, a norbornene-based resin, a polymethylpentene resin, a polyether ketone resin, a polyether ketone-imide resin, a polyamide resin, a fluorine resin, a nylon resin, a polymethyl methacrylate resin, and an acrylic resin. Among those resins, an acrylic resin is preferred. The thickness of the ultraviolet absorption layer is preferably 1 μm to 200 μm.

Instead of providing the ultraviolet absorption layer in the film mirror, an ultraviolet absorbent is added to any one of component layers provided on the light incident side relative to the first resin base material, whereby the layer may serve as the ultraviolet absorption layer. It is preferable that the ultraviolet absorbent is added to the hard coat layer to be described later.

Examples of the ultraviolet absorbent include an organic-based ultraviolet absorbent such as a benzophenone-based ultraviolet absorbent, a benzotriazole-based ultraviolet absorbent, a phenyl salicylate-based ultraviolet absorbent, and a triazine-based ultraviolet absorbent and an inorganic-based ultraviolet absorbent such as titanium oxide, zinc oxide, cerium oxide, and iron oxide.

Examples of a benzophenone-based ultraviolet absorbent include 2,4-dihydroxy benzophenone, 2-hydroxy-4-methoxy-benzophenone, 2-hydroxy-4-n-octoxy-benzophenone, 2-hydroxy-4-dodesiloxy-benzophenone, 2-hydroxy-4-octadesiloxy-benzophenone, 2,2'-dihydroxy-4-methoxy-benzophenone, 2,2'-dihydroxy-4,4'-dimethoxy-benzophenone, and 2,2',4,4'-tetrahydroxy-benzophenone.

Examples of a benzotriazole-based ultraviolet absorbent include 2-(2'-hydroxy-5-methylphenyl)benzotriazole, 2-(2'-hydroxy-3',5'-di-t-butylphenyl)benzotriazole, and 2-(2'-hydroxy-3'-t-butyl-5'-methylphenyl)benzotriazole.

Examples of a phenyl salicylate-based ultraviolet absorbent include phenyl salicylate and 2-4-di-t-butylphenyl-3,5-di-t-butyl-4-hydroxy benzoate. Examples of a hindered amine-based ultraviolet absorbent include bis(2,2,6,6-tetramethyl piperidine-4-yl)sebacate.

Examples of a triazine-based ultraviolet absorbent include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl (2-hydroxy-4-butoxyphenyl)-1,3,5-triazine, 2,4-diphenyl-6-(2-hydroxy 4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, and 2,4-diphenyl-6-(2-hydroxy-4-benzyloxy-phenyl)-1,3,5-triazine.

In addition to the above ultraviolet absorbents, a compound having a function of converting energy of ultraviolet light to a vibrational energy in the molecule and then releasing the vibrational energy as a heat energy or the like may be used. Furthermore, a compound which expresses an effect in combination with an antioxidant, a colorant, or the like, or a light stabilizer called a quencher which acts as a light energy conversion agent may be used together. However, to use the above-mentioned ultraviolet absorbent, it is necessary to select ultraviolet absorbents in which an optical absorption wavelength of the ultraviolet absorbent does not overlap with the effective wavelength of a photopolymerization initiator.

To use a usual ultraviolet absorbent it is effective to use a photopolymerization initiator generating a radical by visible light.

An amount of the ultraviolet absorbent to be used is 0.1 to 20% by mass, preferably 1 to 15% by mass, more preferably 3 to 10% by mass. When the amount of the ultraviolet absorbent to be used is within those ranges, the weather resistance can be improved while maintaining good adhesiveness of other component layers.

(6) Gas Barrier Layer

A gas barrier layer may be provided on the light incident side relative to the first resin base material. In this case, it is preferable that the gas barrier layer is provided on the light incident side relative to the ultraviolet absorption layer.

Although the gas barrier layer is used for preventing deterioration of the first resin base material and each component layer and so on supported by the first resin base material due to fluctuation of humidity, particularly high humidity, the gas barrier layer may have special functions and applications and the gas barrier layer may be provided in various manners as long as it has the deterioration preventing function.

As a moisture-proof property of the gas barrier layer, water vapor transmittance at 40° C. and 90% RH is preferably not more than 1 g/m²·day, more preferably not more than 0.5 g/m²·day, still more preferably not more than 0.2 g/m²·day.

An oxygen transmission rate of the gas barrier layer is preferably not more than 0.6 ml/m²/day/atm under conditions of measurement temperature of 23° C. and humidity of 90% RH.

Examples of a forming method of gas barrier layer include a method of forming an inorganic oxide using a vacuum deposition method, sputtering, an ion beam-assisted method and a chemical vapor deposition method, for example, and a method of coating a precursor of an inorganic oxide by a sol-gel method, then applying heat treatment and/or ultraviolet irradiation treatment to a coating film thus obtained to form an inorganic oxide film is preferably used.

(6-1) Inorganic Oxide

The inorganic oxide is formed from a sol made from an organic metal compound as a raw material by localized heating. Examples of the inorganic oxide include an oxide of an element such as silicon (Si), aluminum (Al), zirconium (Zr), titanium (Ti), tantalum (Ta), zinc (Zn), barium (Ba), indium (In), tin (Sn), and niobium (Nb) contained in an organic metal compound. Such an inorganic oxide is, for example, silicon oxide, aluminum oxide, or zirconium oxide, of which silicon oxide is preferred.

As a method of forming an inorganic oxide in the present invention, a so-called sol-gel method or a polysilazane method is preferably used. In the sol-gel method, an inorganic oxide is formed from an organic metal compound which is a precursor of the inorganic oxide. In the polysilazane method, an inorganic oxide is formed from polysilazane which is a precursor of the inorganic oxide.

(6-2) Precursor of Inorganic Oxide

The gas barrier layer can be formed by coating a precursor which can form an inorganic oxide by heating and applying heat with a common heating method. It is preferable that the gas barrier layer is formed by localized heating. The precursor is preferably an organic metal compound in the form of sol or polysilazane.

(6-3) Organic Metal Compound

An organic metal compound preferably contains at least one element selected from silicon (Si), aluminum (Al), lithium (Li), zirconium (Zr), titanium (Ti), tantalum (Ta), zinc (Zn), barium (Ba), indium (In), tin (Sn), lanthanum (La), yttrium (Y), and niobium (Nb). Particularly, it is preferable that the organic metal compound contains at least one element selected from silicon (Si), aluminum (Al), lithium (Li), zirconium (Zr), titanium (Ti), zinc (Zn), and barium (Ba). It is more preferable that the organic metal compound contains at least one element selected from silicon (Si), aluminum (Al), and lithium (Li).

Although the organic metal compound is not limited especially as long as it can be hydrolyzed, a preferable example of the organic metal compound includes a metal alkoxide.

The metal alkoxide is represented by the following general formula (2):

$$MR^2{}_m(OR^1)_{n-m} \qquad (2)$$

In the above formula (2), M represents metal having an oxidation number of n. $R^1$ and $R^2$ each independently represent an alkyl group and m represents an integer of 0 to (n−1). $R^1$ and $R^2$ may be identical or different from each other. $R^1$ and $R^2$ are each preferably an alkyl group having a number of carbon atoms of 4 or less, more preferably a lower alkyl group such as a methyl group $CH_3$ (hereinafter represented as Me), an ethyl group $C_2H_5$ (hereinafter represented as Et), a propyl group $C_3H_7$ (hereinafter represented as Pr), an isopropyl group i-$C_3H_7$ (hereinafter represented as i-Pr), a butyl group $C_4H_9$ (hereinafter represented as Bu), and an isobutyl group i-$C_4H_9$ (hereinafter represented as i-Bu).

Preferable examples of metal alkoxide represented by the above formula (2) include lithium ethoxide LiOEt, niobium ethoxide Nb(OEt)$_5$, magnesium isopropoxide Mg(Oi-Pr)$_2$, aluminum isopropoxide Al(OPr-i)$_3$, zinc propoxide Zn(OPr)$_2$, tetraethoxysilane Si(OEt)$_4$, titanium isopropoxide Ti(OPr-i)$_4$, barium ethoxide Ba(OEt)$_2$, barium isopropoxide Ba(OPr-i)$_2$, triethoxyborane B(OEt)$_3$, zirconium propoxide Zr(OPr)$_4$, lanthanum propoxide La(OPr)$_3$, yttrium propoxide Y(OPr)$_3$ and lead isopropoxide Pb(OPr-i)$_2$. Those metal alkoxides are commercially available and can be easily obtained. A metal alkoxide is also commercially available in the form of a low condensation product, which is produced through partial hydrolysis, and also usable as a raw material.

(6-4) Sol-Gel Method

A "sol-gel method" refers to a process in which an organic metal compound is, for example, hydrolyzed to obtain a sol of an hydroxide, the sol is dehydrated to obtain a gel, and the gel is subjected to a heat treatment, whereby a metal oxide glass of a specific form (film form, particle form, fibrous form or the like) is prepared. A multicomponent metal oxide glass can be obtained by, for example, a method of mixing a plurality of different sol solutions and a method of adding other metal ions.

More specifically, it is preferable that an inorganic oxide is produced by a sol-gel method having the following steps.

The sol-gel method includes a step of, in a reaction solution containing at least water and an organic solvent, subjecting an organic metal compound to hydrolysis and dehydration condensation to obtain a reaction product while controlling the pH in a range between 4.5 to 5.0 with halogen ions as a catalyst in the presence of boron ions, and a step of heating and vitrifying the reaction product at the temperature of 200 degrees C. or less. The process is particularly preferable because of the reason that the obtained inorganic oxide is free from formation of pores and deterioration of a film due to high-temperature heat treatment.

In the sol-gel method, although an organic metal compound used as a raw material is not limited especially as long as it can be hydrolyzed, a preferable example of an organic metal compound includes the above metal alkoxide.

In the sol-gel method, although the organic metal compound may be used as it is in the reaction, it is preferable that when in use the organic metal compound is diluted with a solvent to facilitate control of the reaction. Any solvent for dilution may be used as long as it is a solvent which can dissolve the organic metal compound and can be uniformly mixed with water. Preferable examples of the diluting solvent include lower aliphatic alcohols such as methanol, ethanol, propanol, isopropanol, butanol, isobutanol, ethylene glycol and propylene glycol and mixtures thereof. Moreover, a mixed solvent of butanol, cellosolve and butylcellosolve, or a mixed solvent of xylole, cellosolve acetate, methylisobutylketone and cyclohexane may be used.

When the metal in the organic metal compound is, for example, Ca, Mg, or Al, an alcohol solution of triethanol amine is preferably added to the reaction solution as a masking agent because the metal reacts with water in the reaction solution to generate a hydroxide or generates a carbonate to cause deposition when carbonate ions $CO_3^{2-}$ exist. The concentration of the organic metal compound when it is mixed and dissolved in the solvent is preferably not more than 70% by mass. It is even more preferable for the organic metal compound to be diluted to 5 to 70% by mass in use.

The reaction solution used in the sol-gel method contains at least water and an organic solvent. Any solvent may be used as the organic solvent as long as it forms a uniform solution with water, acid, and alkali. Usually, a solution similar to aliphatic lower alcohols used to dilute the organic metal compound may be preferably used. Among the aliphatic lower alcohols, preferred are propanol, isopropanol, butanol or isobutanol which has a larger carbon number than methanol and ethanol in view of stabilizing the growth of the resulting metal oxide glass film. The concentration of water as the rate of water in the reaction solution is preferably within a range from 0.2 to 50 mol/L.

In the sol-gel method, the organic metal compound is hydrolyzed in the reaction solution using halogen ions as a catalyst in the presence of boron ions. Trialkoxy borane B (OR)$_3$ is preferred as a compound providing boron ions $B^{3+}$. Particularly, triethoxy borane B (OEt)$_3$ is more preferred. The $B^{3+}$ ion concentration in the reaction solution is preferably within a range from 1.0 to 10.0 mol/L.

Fluorine ions and/or chlorine ions are preferred as halogen ions. Namely, fluorine ions and chlorine ions may be used independently or in mixture of them. Any compound may be used as long as it generates fluorine ions and/or chlorine ions in the reaction solution. Preferable examples of a fluorine ion source include compounds such as ammonium hydrogen fluoride $NH_4HF.HF$ and sodium fluoride NaF. Preferable examples of a chlorine ion source include ammonium chloride $NH_4CH$.

Although the concentration of the halogen ions in the reaction solution varies depending on the thickness of a film made of the inorganic composition having an inorganic matrix to be produced and other conditions, the concentration of the halogen ions is, in general, preferably 0.001 to 2 mol/kg, more preferably 0.002 to 0.3 mol/kg, with respect to the total mass of the reaction solution containing a catalyst. When the concentration of halogen ions is lower than 0.001 mol/kg, it becomes difficult for hydrolysis of the organic metal compound to sufficiently progress, whereby film formation becomes difficult. When the concentration of halogen ions becomes more than 2 mol/kg, the resulting inorganic matrix (metal oxide glass) tends to become non-uniform, therefore, neither case is preferable.

Regarding boron used in the reaction, when having the boron as a component of $B_2O_3$ be remained in a product as a designed composition of the obtained inorganic matrix, the product may be produced while adding the calculated amount of the organic boron compound corresponding to the content of the boron. When the boron is required to be removed, after film formation, the formed film is heated in the presence of methanol as a solvent or immersed in methanol and heated, so that the boron evaporates as methyl esters of boron and can be removed.

In a process of obtaining the reaction product by hydrolysis and dehydration condensation of the organic metal compound, a main solution in which a predetermined amount of the organic metal compound is dissolved in a mixed solvent containing a predetermined amount of water and an organic solvent and a predetermined amount of reaction solution containing a predetermined amount of halogen ions are mixed at a predetermined ratio and sufficiently stirred to obtain a uniform reaction solution. The reaction solution is then adjusted by acid or alkali to have a desired pH value and aged for several hours to thereby allow the reaction to progress to obtain the reaction product. A predetermined amount of the boron compound is previously mixed and dissolved in the main solution or the reaction solution. When alkoxy boron is used, it is advantageous to dissolve the alkoxy boron in the main solution together with another organic metal compound.

The pH of the reaction solution is selected according to the object. When the object is to form a film made of the inorganic composition having the inorganic matrix (metal oxide glass), it is preferable to adjust the pH to a range of 4.5 to 5 using an acid such as hydrochloric acid and then age the reaction solution. In this case, it is convenient to use, for example, a mixture of methyl red and bromo cresol green as an indicator.

In the sol-gel method, while the main solution and the reaction solution (containing $B^{3+}$ and halogen ions) having the same components and concentrations are mixed successively at the same rate while adjusting to have a predetermined pH value, whereby the reaction product can be easily continuously produced. The concentration of the reaction solution may vary within a range of ±50% by mass, the concentration of water (containing acid or alkali) may vary within a range of ±30% by mass, and the concentration of halogen ions may vary within a range of ±30% by mass.

Next, the reaction product obtained in the previous step (the aged reaction solution) is heated to a temperature of not more than 200° C. to be dried so as to be vitrified. In the heating of the reaction product, it is preferable that the temperature is gradually raised with paying special attention in a temperature range of 50 to 70° C. for the purpose of a preliminary drying (solvent vaporization) step and then the temperature is further raised. The preliminary drying step is important for forming a poreless film in the film formation. The temperature at which the reaction product is heated and dried after the preliminary drying step is preferably 70 to 150° C., more preferably 80 to 130° C.

(7) Adhesion Layer

The adhesion layer is not limited especially as long as it has a function of improving adhesiveness between layers. In the examples shown in FIGS. 1A and 1B, the adhesion layer 6 is provided in order to improve the adhesiveness between the ultraviolet absorption layer 5 and the second resin base material 7. Accordingly, the adhesion layer is required to have adhesiveness to allow layers to firmly fix to each other, heat resistance capable of being resistant to heat at the time when forming a silver reflection layer by vacuum deposition and so on, and smoothness to bring about high reflection performance which the metal reflection layer inherently possesses.

The thickness of the adhesion layer is preferably 0.01 to 10 μm and more preferably 0.1 to 10 μm in terms of, for example, adhesiveness, smoothness and reflectance of a reflection material.

When the adhesion layer is a resin, any resin may be used as long as it satisfies the conditions including the adhesiveness, the heat resistance and the smoothness, and a polyester-based resin, an urethane-based resin, an acrylic-based resin, a melamine-based resin, an epoxy-based resin, polyamide-based resin, a vinyl chloride-based resin, and a copolymer resin of vinyl chloride and vinyl acetate may be used independently or in mixture of them. In terms of weather resistance, a mixed resin of a polyester-based resin and a melamine-based resin is preferred and a thermosetting resin in which a curing agent such as isocyanate is mixed is more preferred. As a method of forming the adhesion layer 6, conventionally well-known coating methods such as a gravure coat method, a reverse coat method, and a die coat method may be used.

When the adhesion layer is a metal oxide, the layer made of silicon oxide, aluminum oxide, silicon nitride, aluminum nitride, lanthanum oxide, lanthanum nitride, and the like can be formed through various vacuum film forming methods. Examples of the film forming methods include a resistance heating vacuum deposition method, an electron beam heating vacuum deposition method, an ion plating method, an ion beam-assisted vacuum deposition method, and a sputtering method.

(8) Hard Coat Layer

A hard coat layer is a layer provided on the outermost layer of the film mirror for solar power generation. The thickness of the hard coat layer is preferably not less than 0.5 μm and not more than 10 μm. The hard coat layer contains a polyfunctional acrylic monomer and a silicon resin. The polyfunctional acrylic monomer is hereinafter referred to as an "A" component, and the silicon resin is hereinafter referred to as a "B" component.

(8-1) "A" Component

The "A" component which is the polyfunctional acrylic monomer preferably has an unsaturated group and particularly an active energy ray reactive unsaturated group. The active energy ray mentioned in the present specification is preferably referred to as an electron beam or ultraviolet light. As the polyfunctional acrylic monomer having the active energy ray reactive unsaturated group, radical polymerization-based monomer is used, and, for example, polyfunctional acrylate-based monomer or polyfunctional methacrylate-based monomer which are two or more polyfunctional monomers having α,β-unsaturated double bond in the molecule is preferred. In addition, the "A" component may have a vinyl-type monomer, an allyl-type monomer, or a monofunctional monomer. The radical polymerization-based monomer may be used alone, or two or more kinds of the radical polymerization-based monomers may be used together in order to adjust crosslink density.

As the "A" component, in addition to the relatively low molecular weight compounds such as a monomer in the narrow sense whose molecular weight is less than 1000, oligomer or prepolymer having a relatively large molecular weight, for example, having a molecular weight not less than 1000 and less than 10000 may be used.

Specific examples of a monofunctional (meth)acrylate monomer includes 2-(meth)acryloyloxyethyl phthalate, 2-(meth)acryloyloxyethyl-2-hydroxyethyl phthalate, 2-(meth)acryloyloxyethyl hexahydrophthalate, 2-(meth)acryloyloxypropyl phthalate, 2-ethylhexyl(meth)acrylate, 2-ethylhexyl carbitol(meth)acrylate, 2-hydroxybutyl(meth)acrylate, 2-hydroxyethyl(meth)acrylate, 2-hydroxypropyl(meth)acrylate, 2-methoxyethyl(meth)acrylate, 3-methoxybutyl(meth)acrylate, 4-hydroxybutyl(meth)acrylate, benzyl(meth)acrylate, butanediol mono(meth)acrylate, butoxyethyl(meth)acrylate, butyl(meth)acrylate, caprolactone(meth)acrylate, cetyl(meth)acrylate, cresol(meth)acrylate, cyclohexyl(meth)acrylate, dicyclopentanyl(meth)acrylate, dicyclopentenyl(meth)acrylate, dicyclopentenyloxyethyl(meth)acrylate, diethylene glycol monoethyl ether(meth)acrylate, dimethylaminoethyl(meth)acrylate, dipropylene glycol(meth)acrylate, phenyl(meth)acrylate, ethyl(meth)acrylate, isoamyl(meth)acrylate, isobornyl(meth)acrylate, isobutyl(meth)acrylate, isodecyl(meth)acrylate, isooctyl(meth)acrylate, isostearyl(meth)acrylate, isomyristyl(meth)acrylate, lauroxy polyethylene glycol(meth)acrylate, lauryl(meth)acrylate, methoxy dipropylene glycol(meth)acrylate, methoxy tripropylene glycol(meth)acrylate, methoxy polyethylene glycol(meth)acrylate, methoxy triethylene glycol(meth)acrylate, methyl(meth)acrylate, neopentyl glycol benzoate(meth)acrylate, nonyl phenoxy polyethylene glycol (meth)acrylate, nonyl phenoxy polypropylene glycol (meth acrylate, octafluoropentyl(meth)acrylate, octoxy polyethylene glycol-polypropylene glycol(meth)acrylate, octyl(meth)acrylate, paracumylphenoxyethylene glycol(meth)acrylate, perfluorooctylethyl(meth)acrylate, phenoxy(meth)acrylate, phenoxy diethylene glycol(meth)acrylate, phenoxyethyl(meth)acrylate, phenoxy hexaethyleneglycol(meth)acrylate, phenoxy tetraethylene glycol(meth)acrylate, polyethylene glycol(meth)acrylate, stearyl(meth)acrylate, succinic acid (meth)acrylate, t-butyl(meth)acrylate, t-butyl cyclohexyl (meth)acrylate, tetrafluoropropyl(meth)acrylate, tetrahydrofurfuryl(meth)acrylate, tribromophenyl(meth)acrylate, tridecyl(meth)acrylate, trifluoroethyl(meth)acrylate, β-carboxyethyl(meth)acrylate, ω-carboxy-polycaprolactone (meth)acrylate, and derivatives and modified products of these monofunctional (meth)acrylate monomers.

Specific examples of a polyfunctional (meth)acrylate monomer includes 1,3-butylene glycol di(meth)acrylate, 1,4-butanediol di(meth)acrylate, 1,6-hexanediol di(meth)acrylate, 1,9-nonanediol di(meth)acrylate, bisphenol A di(meth)

acrylate, bisphenol F di(meth)acrylate, diethylene glycol di(meth)acrylate, hexahydrophthalic acid di(meth)acrylate, hydroxy pivalic acid neopentyl glycol di(meth)acrylate, neopentyl glycol di(meth)acrylate, hydroxy pivalic acid ester neopentyl glycol di(meth)acrylate, pentaerythritol di(meth)acrylate, phthalic acid di(meth)acrylate, polyethylene glycol di(meth)acrylate, polypropylene glycol di(meth)acrylate, polytetramethylene glycol di(meth)acrylate, bisphenol A diglycidyl ether di(meth)acrylate, triethylene glycol di(meth)acrylate, tetraethylene glycol di(meth)acrylate, tricyclodecanedimethanol di(meth)acrylate, dimethylol dicyclopentane di(meth)acrylate, neopentyl glycol-modified trimethylolpropane di(meth)acrylate, tripropylene glycol di(meth)acrylate, triglycerol di(meth)acrylate, dipropylene glycol di(meth)acrylate, glycerol tri(meth)acrylate, pentaerythritol tri(meth)acrylate, phosphoric acid tri(meth)acrylate, trimethylolpropane tri(meth)acrylate, trimethylolpropane benzoate tri(meth)acrylate, tris((meth)acryloxyethyl) isocyanurate, di(meth)acrylated isocyanurate, dipentaerythritol hexa(meth)acrylate, dipentaerythritol hydroxy penta(meth)acrylate, ditrimethylolpropane tetra(meth)acrylate, pentaerythritol tetra(meth)acrylate, and derivatives and modified products of these polyfunctional (meth)acrylate monomers.

Examples of commercial products of the "A" component as such a polymerizable organic compound include Aronix M-400, M-408, M-450, M-305, M-309, M-310, M-315, M-320, M-350, M-360, M-208, M-210, M-215, M-220, M-225, M-233, M-240, M-245, M-260, M-270, M-1100, M-1200, M-1210, M-1310, M-1600, M-221, M-203, TO-924, TO-1270, TO-1231, TO-595, TO-756, TO-1343, TO-902, TO-904, TO-905, TO-1330 (produced by Toagosei Co., Ltd.), KAYARAD D-310, D-330, DPHA, DPCA-20, DPCA-30, DPCA-60, DPCA-120, DN-0075, DN-2475, SR-295, SR-355, SR-399E, SR-494, SR-9041, SR-368, SR-415, SR-444, SR-454, SR-492, SR-499, SR-502, SR-9020, SR-9035, SR-111, SR-212, SR-213, SR-230, SR-259, SR-268, SR-272, SR-344, SR-349, SR-601, SR-602, SR-610, SR-9003, PET-30, T-1420, GPO-303, TC-120S, HDDA, NPGDA, TPGDA, PEG400DA, MANDA, HX-220, HX-620, R-551, R-712, R-167, R-526, R-551, R-712, R-604, R-684, TMPTA, THE-330, TPA-320, TPA-330, KS-HDDA, KS-TPGDA, KS-TMPTA (produced by Nippon Kayaku Co., Ltd.). Light Acrylate PE-4A, DPE-6A, and DTMP-4A (produced by Kyoeisha Chemical Co., Ltd.).

From the viewpoint of enhancing the antifouling property and the light resistance, the polymerizable organic compound "A" component is preferably contained in an amount of 10 to 90% by weight, more preferably 15 to 80% by weight, based on 100% by weight of the total composition of "A"+"B".

(8-2) "B" Component

The silicon resin "B" component is preferably a silicon resin having an active energy ray reactive unsaturated group. The silicon resin contains polyorganosiloxane and is preferably a compound having a polyorganosiloxane chain which has an active energy ray curable unsaturated bond in the molecule. In particular, the "B" component is preferably an active energy ray curable resin component which is a vinyl copolymer with a number average molecular weight of 5000 to 100000 synthesized by reacting a polymer (a), which is obtained by polymerizing monomers including 1 to 50% by weight of a monomer (a) having a radical polymerizable double bond and a polyorganosiloxane chain, 10 to 95% by weight of a monomer (b) other than (a), which has a radical polymerizable double bond and a reactive functional group, and 0 to 89% by weight of a monomer (c) other than (a) and (b), which has a radical polymerizable double bond, with a compound (β) having a functional group capable of reacting with the reactive functional group and a radical polymerizable double bond.

Specific examples of the monomer (a) having a radical polymerizable double bond and a polyorganosiloxane chain include a polyorganosiloxane compound having a (meth) acryloxy group at one end such as Silaplane FM-0711, FM-0721, and FM-0725 manufactured by Chisso Corporation, AC-SQ SI-20 manufactured by Toagosei Co., Ltd., and an acrylate or methacrylate containing compound of POSS (Polyhedral Oligomeric Silsesquioxane) series produced by Hybrid Plastics Inc.

One kind of or a mixture of two or more kinds of the "B" components may be used according to required performance. The proportion of polymerization is preferably 1 to 50% by weight based on the total weight of a monomer constituting a polymer, more preferably 10 to 35% by weight. When the proportion of copolymerization of the "B" component is less than 1% by weight, it is difficult to impart an antifouling property and weather resistance to an upper surface of a cured material, and when the proportion of copolymerization of the "B" component is more than 50% by weight, scratch resistance is lowered and, in addition, it is difficult to obtain coating performance such as compatibility with other components contained in a radiation curable composition, adhesiveness with a base material and toughness, and solubility to the solvent of a polymer.

The above component may contain a suitable amount of polysiloxane and the durability is enhanced by adding polysiloxane according to the chemical structure and quantitative ratio of the "B" component.

It is preferable that the hard coat layer has flexibility to prevent warpage.

A hard coat layer on the outermost surface layer of a film mirror may form a dense cross-linked structure, and thus the film may be warped and bent, or a crack may be easily formed because of no flexibility, so that the handling is difficult. In such a case, it is preferable to perform design so that bendability and flatness are obtained by adjusting an amount of an inorganic substance in a hard coat layer composition.

It is preferable that the hard coat layer contains an ultraviolet absorbent and/or an antioxidant.

(8-3) Ultraviolet Absorbent

Examples of an organic ultraviolet absorbent include benzophenone-based ultraviolet absorbent, benzotriazole-based ultraviolet absorbent, phenyl salicylate-based ultraviolet absorbent, and triazine-based ultraviolet absorbent. Examples of an inorganic ultraviolet absorbent include titanium oxide, zinc oxide, cerium oxide, and iron oxide.

Examples of a benzophenone-based ultraviolet absorbent include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxy-benzophenone, 2,2'-dihydroxy-4,4'-dimethoxy-benzophenone, and 2,2',4,4'-tetrahydroxy-benzophenone.

Examples of a phenyl salicylate-based ultraviolet absorbent include phenyl salicylate and 2-4-di-t-butylphenyl-3,5-di-t-butyl-4-hydroxybenzoate. Examples of a hindered amine-based ultraviolet absorbent include bis(2,2,6,6-tetramethylpiperidine-4-yl)sebacate.

Examples of a triazine-based ultraviolet absorbent include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5- triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, and 2,4-diphenyl-6-(2-hydroxy-4-benzyloxyphenyl)-1,3,5-triazine.

Among the ultraviolet absorbents, particularly preferred is a benzotriazole-based ultraviolet absorbent.

Examples of a benzotriazole-based ultraviolet absorbent include 2-(2'-hydroxy-5-methylphenyl)benzotriazole, 2-(2'-hydroxy-3',5'-di-t-butylphenyl)benzotriazole, and 2-(2'-hydroxy-3'-t-butyl-5'-methylphenyl)benzotriazole. For example, a compound represented by the following general formula (1) may be used as the benzotriazole-based ultraviolet absorbent:

[Chemical 2]

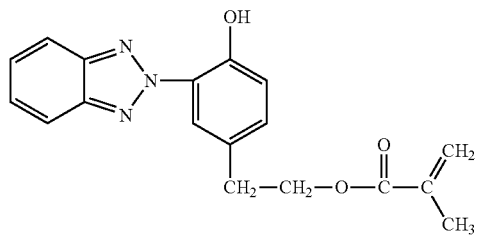

(1)

When the hard coat layer contains the benzotriazole-based ultraviolet absorbent, an excellent effect can be obtained that the weather resistance is further improved and, at the same time, the falling angle can be further reduced. Especially when the hard coat layer contains a compound represented by the general formula (1), the effect of reducing the falling angle is pronounced. The falling angle means an angle obtained by measuring a minimum angle as follows. A water droplet is dropped on a horizontal mirror, and thereafter an inclination angle of the mirror is gradually increased. When the predetermined weight of stationary water droplet is fallen at the minimum angle, the angle is the falling angle. The smaller the falling angle, the easier water droplets are rolled off from the surface, so that it can be said that the surface is a surface on which water droplets are less likely to be adhered.

In order to obtain the ultraviolet absorbing power, an inorganic-based ultraviolet absorbent may be used, and titanium oxide, zinc oxide, strontium oxide, and cerium oxide may be used, for example. Processed molecules in which photocatalytic activity is suppressed may be used. For example, there can be applied processed molecules in which an inorganic-based ultraviolet absorbent is covered with a silica component and molecules in which laser beam is irradiated and the photocatalytic activity is suppressed as small as possible while the ultraviolet absorbing power is maintained.

In addition to the above ultraviolet absorbents, a compound having a function of converting energy of ultraviolet light to vibrational energy in the molecule and then releasing the vibrational energy as heat energy or the like may be used. Furthermore, a compound which expresses an effect in combination with an antioxidant or a colorant, or a light stabilizer called a quencher which acts as a light energy conversion agent may be used together. However, to use the above-mentioned ultraviolet absorbent, it is necessary to select ultraviolet absorbents in which an optical absorption wavelength of the ultraviolet absorbent does not overlap with the effective wavelength of a photopolymerization initiator.

To use a general ultraviolet absorbent, it is effective to use a photopolymerization initiator that generates a radical by visible light.

It is preferable that an amount of the ultraviolet absorbent to be used is 0.1 to 20% by mass in order to improve the weather resistance while maintaining good adhesiveness. The amount of the ultraviolet absorbent to be used is more preferably 0.25 to 15% by mass, still more preferably 0.5 to 10% by mass.

(8-4) Antioxidant

As an antioxidant, an organic-based antioxidant such as a phenol-based antioxidant, a thiol-based antioxidant and a phosphite-based antioxidant is preferably used. The falling angle can be reduced by allowing the organic-based antioxidant to be contained in the hard coat layer.

Examples of a phenol-based antioxidant includes 1,1,3-tris(2-methyl-4-hydroxy-5-t-butylphenyl)butane, 2,2'-methylenebis(4-ethyl-6-t-butylphenol), tetrakis-[methylene-3-(3',5'-di-t-butyl-4'-hydroxyphenyl)propionate]methane, 2,6-di-t-butyl-p-cresol, 4,4'-thiobis(3-methyl-6-t-butylphenol), 4,4'-butylidenebis(3-methyl-6-t-butylphenol), 1,3,5-tris(3',5'-di-t-butyl-4'-hydroxybenzyl)-S-triazine-2,4,6-(1H,3H,5H)trione, stearyl-β-(3,5-di-t-butyl-4-hydroxyphenyl)propionate, triethylene glycol bis[3-(3-t-butyl-5-methyl-4-hydroxyphenyl)propionate], 3,9-bis[1,1-di-methyl-2-[β-(3-t-butyl-4-hydroxy-5-methylphenyl)propionyloxy]ethyl]-2,4,8,10-tetraoxaspiro[5,5]undecane, and 1,3,5-trimethyl-2,4,6-tris(3,5-di-t-butyl-4-hydroxybenzyl)benzene. A phenol-based antioxidant having a molecular weight of not less than 550 is particularly preferred.

Examples of a thiol-based antioxidant include distearyl-3,3'-thiodipropionate, and pentaerythritol-tetrakis-(β-lauryl-thiopropionate).

Examples of a phosphite-based antioxidant include tris(2,4-di-t-butylphenyl)phosphite, distearylpentaeiythritol diphosphite, di(2,6-di-t-butylphenyl)pentaerythritol diphosphite, bis-(2,6-di-t-butyl-4-methylphenyl)-pentaerythritol diphosphite, tetrakis(2,4-di-t-butylphenyl) 4,4'-biphenylene-diphosphonite, and 2,2'-methylenebis(4,6-di-t-butylphenyl)octylphosphite.

In the present invention, the above antioxidant and the following light stabilizer can be used together.

Examples of a hindered amine-based light stabilizer include bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-(3,5-di-t-butyl-4-hydroxybenzyl)-2-n-butylmalonate. 1-methyl-8-(1,2,2,6,6-pentamethyl-4-piperidyl)-sebacate, 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine, 4-benzoyloxy-2,2,6,6-tetramethylpiperidine, tetrakis(2,2,6,6-tetramethyl-4-piperidyl)-1,2,3,4-butane-tetracarboxylate, triethylenediamine, and 8-acetyl-3-dodecyl-7,7,9,9-tetramethyl-1,3,8-triazaspiro[4,5]decane-2,4-dione.

Of hindered amine-based light stabilizers, hindered amine-based light stabilizer containing only a tertiary amine is particularly preferred, and specific examples thereof include bis(1,2,2,6,6-pentamethyl-4-piperidyl)-sebacate, bis(1,2,2,6,6-pentamethyl-4-piperidyl)-2-(3,5-di-t-butyl-4-hydroxybenzyl)-2-n-butylmalonate. Further, a condensate of 1,2,2,6,6-pentamethyl-4-piperidinol/tridecylalcohol and 1,2,3,4-butanetetracarboxylic acid is also preferred.

In addition, a nickel-based ultraviolet stabilizer is usable as a light stabilizer, and examples of the nickel-based ultraviolet stabilizer include [2,2'-thiobis(4-t-octylphenolate)]-2-ethylhexylamine nickel (II), nickel complex-3,5-di-t-butyl-4-hydroxybenzyl.phosphoric acid monoethylate, and nickel.dibutyl-dithiocarbamate.

(8-5) Initiator

The hard coat layer preferably contains an initiator for starting polymerization. A photopolymerization initiator of an active energy ray (such as ultraviolet light)-curable resin is preferably used. Examples of the initiator include benzoin and a derivative thereof, acetophenone, benzophenone, hydroxybenzophenone, Michler's ketone, α-amyloxim ester, thioxanthone and their derivatives. The initiator may be used with a photosensitizer. The above initiator can also be used as a photosensitizer. Moreover, sensitizers such as n-butylamine, triethylamine and tri-n-butylphosphine can be used when an epoxy acrylate-based initiator is used. The content of the initiator or the photosensitizer is 0.1 to 15 parts by mass, preferably 1 to 10 parts by mass, more preferably 2 to 5 parts by mass, based on 100 parts by mass of the composition. Two types of initiators may be used together, and especially when a radical initiator is used, at least two types of initiators may be used. Radical initiators absorbing different wavelengths are preferably used, and two types of initiators having different ultraviolet absorption wavelengths are more preferably used. For example, when only an initiator absorbing a shorter wavelength is used, at times it is not able to perform polymerization reaction of all monomers with the initiator. Meanwhile, when only an initiator absorbing a longer wavelength is used, although reactivity is improved, the initiator may be colored during long-term use. Thus, it is preferable to use radical initiators which are not colored even during long-term use, improve the weather resistance, and absorb different wavelengths in order to improve the polymerization reactivity.

(9) Primer Layer

When the adhesiveness cannot be satisfactorily secured due to poor compatibility with a layer such as the second resin base material which is to become a base of the hard coat layer, a primer layer is formed on the layer such as the second resin base material, whereby the adhesiveness can be secured. The primer layer is not limited especially as long as it is transparent and is configured to have a large amount of hydroxyl group on its surface. It is preferable that the primer layer is an inorganic layer formed by, for example, silica, alumina, and zirconia, and it is more preferable that the primer layer is formed by polysilazane. As a method of primer layer formation, the primer layer can be formed by a vacuum film forming method or a sol-gel method. Examples of the vacuum film forming method include resistance heating type vacuum vapor deposition method, an electron-beam heating type vacuum deposition method, an ion plating method, an ion beam-assisted vacuum vapor deposition method, and a sputtering method. Particularly, the primer layer is preferably formed by coating polysilazane as a film and heat-curing of the film. As a preferred method employed when a precursor of the primer layer contains polysilazane, a solution containing polysilazane represented by the following general formula (3) and an organic solvent containing a catalyst as necessary is coated, and the solvent is evaporated and removed, whereby a polysilazane layer having a layer thickness of 0.05 to 3.0 μm is remained on the layer such as the second resin base material. Then, the polysilazane layer is locally heated in the presence of oxygen, active oxygen, and, according to circumstances, nitrogen in an atmosphere including water vapor, whereby a transparent coat like glass is formed on the second resin base material.

  (3)

In the above formula (3), $R^1$, $R^2$, and $R^3$, which may be the same or different, each independently represent a group selected from hydrogen or an alkyl group, an aryl group, a vinyl group or (trialkoxysilyl)alkyl group, which may be substituted in some cases, preferably the group consisting of hydrogen, methyl, ethyl, propyl, iso-propyl, butyl, iso-butyl, tert-butyl, phenyl, vinyl or 3-(triethoxysilyl)propyl, and 3-(trimethoxysilyl)propyl. In the formula, n is an integer and is determined so that the polysilazane has a number average molecular weight of 150 to 150,000 g/mol.

As a catalyst, a basic catalyst is preferably used, and especially N,N-diethyl ethanolamine, N,N-dimethylethanolamine, triethanolamine, triethylamine, 3-morpholino propyl amine, or N-heterocyclic compound is preferably used. The catalyst concentration is usually in the range of 0.1 to 10 mol %, preferably 0.5 to 7 mol %, based on polysilazane.

In a preferred embodiment, a solution containing perhydropolysilazane in which all of $R^1$, $R^2$, and $R^3$ are hydrogen atoms is used.

In another preferred embodiment, a coating according to the present invention contains at least one kind of polysilazane represented by the following general formula (4).

  (4)

In the above formula (4), $R^1$, $R^2$, $R^3$, $R^4$, $R^5$, and $R^6$ each independently represent hydrogen or an alkyl group, an aryl group, a vinyl group or (trialkoxysilyl) alkyl group, which may be substituted in some instances. In the formula, n and p are integers, and n is determined so that the polysilazane has a number average molecular weight of 150 to 150,000 g/mol.

Particularly preferred are a compound in which $R^1$, $R^3$, and $R^6$ represent hydrogen, $R^2$, $R^4$, and $R^5$ represent methyl, a compound in which $R^1$, $R^3$, and $R^6$ represent hydrogen, $R^2$ and $R^4$ represent methyl, and $R^5$ represents vinyl, and a compound in which $R^1$, $R^3$, $R^4$ and $R^6$ represent hydrogen, and $R^2$ and $R^5$ represent methyl.

A solution containing at least one kind of polysilazane represented by the following general formula (5) is similarly preferred.

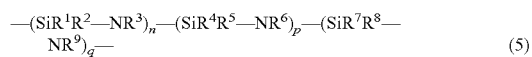  (5)

In the above formula (5), $R^1$, $R^2$, $R^3$, $R^4$, $R^5$, $R^6$, $R^7$, $R^8$, and $R^9$ each independently represent hydrogen or an alkyl group, an aryl group, a vinyl group or (trialkoxysilyl)alkyl group, which may be substituted in some instances. In the formula, n, p and q are integers, and n is determined so that the polysilazane has a number average molecular weight of 150 to 150,000 g/mol.

Particularly preferred is a compound in which $R^1$, $R^3$, and $R^6$ represent hydrogen, $R^2$, $R^4$, $R^5$ and $R^8$ represent methyl, $R^9$ represents (triethoxysilyl)propyl, and $R^7$ represents alkyl or hydrogen.

The proportion of a polysilazane in a solvent is generally 1 to 80% by mass, preferably 5 to 50% by mass, more preferably 10 to 40% by mass.

A solvent is preferably an organic solvent which does not contain water and a reactive group (for example, a hydroxyl group or an amine group) and is inert to polysilazane, more preferably an aprotic solvent. Examples of the solvent include an aliphatic or aromatic hydrocarbon, halogen hydrocarbon, ester such as ethyl acetate and butyl acetate, ketone such as acetone and methyl ethyl ketone, ether such as tetrahydrofuran or dibutyl ether, mono- or poly-alkylene glycol dialkyl ether (diglymes), and a mixture of these solvents.

An additional component of the polysilazane solution may be another binder such as commonly used in the manufacturing of paints. Specific examples of a binder include a cellulose ether and cellulose ester such as ethyl cellulose, nitrocellulose, cellulose acetate, or cellulose acetobutylate, a natural resin such as rubber or a rosin resin, and a synthetic resin, for example, a polymer resin or a condensation resin, such as aminoplast, particularly, urea resin and melamine formaldehyde resin, alkyd resin, acryl resin, polyester or modified polyester, epoxide, polyisocyanate or blocked polyisocyanate, and polysiloxane.

Other components of the polysilazane composition include, for example, additives affecting viscosity of a composition, wettability of a substrate, film forming property, lubricating action or exhaust characteristics or inorganic nanoparticles such as $SiO_2$, $TiO_2$, $ZnO$, $ZrO_2$ and $Al_2O_3$.

The thickness of a coat formed as the primer layer is preferably in the range of 10 nm to 1 μm. The polysilazane primer layer may be used as an oxygen and water vapor barrier film.

(10) Sticky Layer

A reflection device for solar power generation is produced by applying a film mirror for solar power generation to a support base material through a sticky layer. As a preferred embodiment of the reflection device for solar power generation, a reflection device shown in FIG. 1B is exemplified. A reflection device 20 for solar power generation is configured by applying a film mirror 10 for solar power generation to a support base material 12 through a sticky layer 11.

A sticky layer used for adhering the film mirror to a support base material is not limited especially and, for example, any of a dry laminate agent, a wet laminate agent, a sticky adhesive, a heat sealing agent, a hot melt agent is usable. Examples of the sticky adhesive include polyester-based resins, urethane-based resins, polyvinyl acetate-based resins, acrylic resins, and nitrile rubber.

The laminate method is not limited especially and it is preferable that film formation is continuously performed by, for example, a roll method in terms of economic efficiency and productivity.

It is preferable that the thickness of the sticky layer is usually in the range of approximately 1 to 100 μm in terms of adhesion effect, a drying rate, and the like.

(11) Support Base Material

As a support base material used in the reflection device for solar power generation, a steel plate, a copper plate, an aluminum plate, an aluminum plated steel plate, an aluminum-based alloy plated steel plate, a copper plated steel plate, a tin plated steel plate, a chromium plated steel plate, a metallic material having a high thermal conductivity such as a stainless steel plate, and a steel plate in which a resin and a metallic plate are combined are usable.

In the present invention, a plated steel plate, a stainless steel plate, an aluminum plate and so on which have good corrosion resistance are particularly preferred. More preferably, the steel plate in which a resin and a metallic plate are combined is used.

The reflection device for solar power generation having the above structure is preferably usable for the purpose of collecting sunlight.

When the reflection device for solar power generation is used, as one aspect, the reflection device is structured to have a gutter shape (semi-cylindrical shape) and a tubular member containing a fluid is provided in a central portion of the semicircular shape of the reflection device. The sunlight is collected at the tubular member to thereby heat the fluid inside the tubular member and the heat energy is converted to perform power generation.

As another aspect, planar reflection devices are installed at a plurality of positions, the sunlight reflected by the respective reflection devices is collected at a single reflector (central reflector) and heat energy obtained by reflection by the reflector is converted by a power generation portion, whereby power generation is performed. Especially, in the latter aspect, since a high regular reflectance is required for the reflection device to be used, the film mirror for solar power generation of the present invention is particularly suitably used.

EXAMPLES

Hereinafter, the present invention will be specifically described using examples and comparative examples. A film mirror of this example is an embodiment shown in FIG. 1A. However, this invention is not limited to them. Although such signs as "part" and "%" are used in the following examples and comparative examples, the "part" and "%" respectively represent "part by mass" or "% by mass" unless otherwise designated.

[Method of Manufacturing Reflective Film]

A biaxially-stretched polyester film (polyethylene terephthalate film having a thickness of 25 μm) was used as a first resin base material 1. A polyester-based resin (POLYESTER SP-181 produced by Nippon Synthetic Chemical Industry Co., Ltd.) and TDI (tolylene diisocyanate)-based isocyanate (2,4-tolylene diisocyanate) were mixed at a resin solid content ratio of 10:2, added with methyl ethyl ketone as a solvent and further added with glycol dimercaptoacetate (produced by Wako Pure Chemical Industries, Ltd.) as a corrosion inhibitor by 10% by mass, and the resultant solution was coated by a gravure coat method on one side of the polyester film to form an anti-corrosion layer 2 having a thickness of 60 nm.

Subsequently, a silver reflection layer 3 was film-formed on the anti-corrosion layer 2 by vacuum deposition so that the thickness of the silver reflection layer 3 became 80 nm.

Next, an anti-corrosion layer 4 was formed on the silver reflection layer 3 in a similar manner except that Tinuvin 234 (produced by Ciba Japan K. K.) was used instead of glycol dimercaptoacetate of the anti-corrosion layer 2

The anti-corrosion layer 4 was coated with an ultraviolet absorbing polymer "New Coat UVA-204W" (produced by Shin-Nakamura Chemical Co., Ltd.) by a gravure coat method so that the thickness of the ultraviolet absorbing polymer was 5 μm to form an ultraviolet absorption layer 5 on the anti-corrosion layer 4.

The ultraviolet absorption layer 5 was coated with an adhesive TBS-730 (produced by Dainippon Ink and Chemicals, Inc.) by a gravure coat method so that the thickness of the adhesive was 5 pun to form an adhesion layer 6 on the ultraviolet absorption layer 5, and an acrylic resin Sumitomo Chemical S001 (75 μm) containing an ultraviolet absorbent was bonded onto the adhesion layer 6 by a roll method to form a second resin base material 7.

As described above, a reflection film in which the component layers other than the hard coat layer 8 were stacked was produced.

[Production of Hard Coat Liquid No. 1]

As the "B" component of a hard coat, there is used a radiation curable vinyl copolymer having a polyorganosiloxane chain obtained by synthesizing 20 parts of a polysiloxane compound having a methacryloxy group at one end (produced by Chisso Corporation "Silaplane FM-0721"), 70 parts of glycidyl methacrylate, 10 parts of butyl methacrylate and 35 parts of acrylic acid.

An active energy ray curable resin component is obtained by preparation in an organic solvent with, based on 100% by weight of the active energy ray curable resin component as a total weight, 5% by weight of a silicon resin which is the polyorganosiloxane chain-containing radiation curable vinyl copolymer as the "B" component which has an ultraviolet reactive group, 4% by weight of 1-hydroxy-cyclohexyl-phenylketone (Ciba Japan K. K.) as a photoinitiator, and 91% by weight of a resin as the "A" component in which tripentaerythritol hexaacrylate, trimethylol propane triacrylate and urethane acrylate EBECRYL 8405 (all of them produced by Daicel-Cytec Co., Ltd.) are contained by a ratio of 2:2:1.

[Production of Hard Coat Liquid No. 2]

An active energy ray curable resin component is obtained by preparation in an organic solvent with, based on 100% by weight of the active energy ray curable resin component as a total weight, 4% by weight of 1-hydroxy-cyclohexyl-phenylketone (Ciba Japan K. K.) as a photoinitiator, 1% by weight of BYK-SILCLEAN-3700 as a reveling agent, and tripentaerythritol hexaacrylate PETRA, trimethylol propane triacrylate (TMPTA) and urethane acrylate EBECRYL 8405 (all of them produced by Daicel-Cytec Co., Ltd.) as a resin by a ratio of 2:2:1.

Comparative Example 1

FIG. 1A shows the structure of Comparative Example 1.

The hard coat liquid No. 2 is coated on the reflection film by a wire bar, dried at 80° C. for 60 seconds, and then irradiated with ultraviolet light under a nitrogen atmosphere, whereby a hard coat layer 8 having a dry film thickness of 5 μm is formed so as to produce a film mirror of Comparative Example 1.

Comparative Example 2

The hard coat liquid No. 2 is added with 1% by weight of a benzotriazole-based ultraviolet absorbent RUVA-93 (produced by Otsuka Chemical Co., Ltd.) satisfying the general formula (1) to form a hard coat layer 8 in a similar manner to that in Comparative Example 1 so as to produce a sample of Comparative Example 2.

Example 1

The hard coat liquid No. 1 is coated on the reflection film by a wire bar, dried at 80° C. for 60 seconds, and then irradiated with ultraviolet light under a nitrogen atmosphere, whereby a hard coat layer 8 having a dry film thickness of 5 μm is formed so as to produce a film mirror of Example 1.

Example 2

The hard coat liquid No. 1 is added with 1% by weight of a benzotriazole-based ultraviolet absorbent RUVA-93 (produced by Otsuka Chemical Co., Ltd.) satisfying the general formula (1) and a hard coat layer 8 is formed in a similar manner to that in Example 1 so as to produce a sample of Example 2.

Example 3

The hard coat liquid No. 1 is added with 1% by weight of a triazine-based ultraviolet absorbent Tinuvin 477 (produced by Ciba Japan K. K.) and a hard coat layer 8 is formed in a similar manner to that in Example 1 so as to produce a sample of Example 3.

Example 4

The hard coat liquid No. 1 is added with 1% by weight of an antioxidant 2,2'-methylenebis(4,6-di-t-butylphenyl) octyl phosphite (produced by Otsuka Chemical Co., Ltd.) to form a hard coat layer 8 in a similar manner to that in Example 1 so as to produce a sample of Example 4.

Example 5

The hard coat liquid No. 1 is added with 1% by weight of an antioxidant Tinuvin 152 (produced by Ciba Japan K. K.) to form a hard coat layer 8 in a similar manner to that in Example 1 so as to produce a sample of Example 5.

Example 6

A sample of example 6 is produced in a similar manner to that of Example 5 except that 2 wt % of 1-hydroxy-cyclohexyl-phenylketone (Ciba Japan K. K.) and 2 wt % of bis(2,4,6-trimethylbenzoyl)-phenylphosphine oxide (Ciba Japan K. K.) are added as an initiator of the hard coat liquid. Namely, a sample of this example contains the antioxidant Tinuvin 152.

Example 7

A sample of Example 7 is produced in a similar manner to that of Example 5 except that 2.5 wt % of 2-hydroxy-2-methyl-1-phenylpropane-1-one (produced by Ciba Japan K. K.) and 1.5 wt % of 2,4,6-trimethyl benzoyl-diphenylphosphine oxide (produced by Ciba Japan K. K.) are alternatively used as an initiator contained in the hard coat liquid prepared in Example 5. Namely, a sample of this example contains an antioxidant Tinuvin 152.

Example 8

A sample of Example 8 is produced in a similar manner to that of Example 7 except that 5 wt % of polyorganosiloxane (produced by Doken Co., Ltd.) is added to the hard coat liquid prepared in Example 7. Namely, in this example, 2.5 wt % of 2-hydroxy-2-methyl-1-phenylpropane-1-one (produced by Ciba Japan K. K.) and 1.5 wt % of 2,4,6-trimethyl benzoyl-diphenyl-phosphine oxide (produced by Ciba Japan K. K.) are used as an initiator, and at the same time, Example 8 contains the antioxidant Tinuvin 152.

Example 9

A sample of Example 9 is produced in a similar manner to that of Example 8 except that 1% by weight of an ultraviolet absorbent RUVA-93 (produced by Otsuka Chemical Co., Ltd.) is added to the hard coat liquid prepared in Example 8. Namely, in this example, 2.5 wt % of 2-hydroxy-2-methyl-1-phenylpropane-1-one (produced by Ciba Japan K. K.) and 1.5 wt % of 2,4,6-trimethyl benzoyl-diphenyl-phosphine oxide (produced by Ciba Japan K. K.) are used as an initiator, the sample contains the antioxidant Tinuvin 152 and 5 wt % of polyorganosiloxane (produced by Doken Co., Ltd.) is added to the hard coat liquid.

Example 10

A sample of Example 10 is produced in a similar manner to that of Example 8 except that 1% by weight of an ultraviolet absorbent Tinuvin 477 (produced by Ciba Japan K. K.) is added to the hard coat liquid prepared in Example 8. Namely, in this example, 2.5 wt % of 2-hydroxy-2-methyl-1-phenylpropane-1-one (produced by Ciba Japan K. K.) and 1.5 wt % of 2,4,6-trimethyl benzoyl-diphenyl-phosphine oxide (produced by Ciba Japan K. K.) are used as an initiator, the sample contains the antioxidant Tinuvin 152 and 5 wt % of polyorganosiloxane (produced by Doken Co., Ltd.) is added to the hard coat liquid.

[Evaluation of Film Mirror for Solar Power Generation]

A regular reflectance test, a steel wool test as a measure of scratch resistance (ultraviolet resistance), a contact angle test and a falling angle test as a measure of antifouling property and an outdoor exposure field test as a weather resistance test are performed in accordance with the following method, and each item is evaluated for the film mirrors for solar power generation (Comparative Examples 1 and 2 and Examples 1 to 10) produced as above.

[Measurement of Regular Reflectance]

The regular reflectance when an incident angle of incident light was 5° with respect to a normal line of a reflecting surface was measured by using a spectrophotometer "U-4100" manufactured by Shimadzu Corporation. An average reflectance from 250 nm to 2500 nm was measured for evaluation of the regular reflectance.

[Steel Wool Test]

As the test of scratch resistance, steel wool (#0000) as a wear material was attached to a reciprocating wear tester (HEIDON-14DR manufactured by Shinto Scientific Co., Ltd.), and the tester was reciprocated 10 times at a speed of 10 mm/sec on a surface of each of the water repellency/antifouling article under a condition of load of 500 g/cm$^2$. The number of scratches after the test was evaluated. In addition, the scratch resistance after standing for six months under irradiation with a xenon lamp (UV) under conditions of a temperature of 75° C. and humidity of 85% RH was measured by the steel wool test in a similar manner to above, and the number of scratches after the test was evaluated.

[Contact Angle Test]

3 μl of water was dropped and the contact angle of a surface of the film mirror was measured using a contact angle meter DM300 (Kyowa Interface Science Co., Ltd.) based on JIS-R3257.

[Falling Angle Test]

A sliding method kit DM-SA01 was attached to a contact angle meter DM501 (Kyowa Interface Science Co., Ltd.), 50 μl of water was dropped, a support was tilted at a rate of 0.5°/sec from a horizontal state and an angle at the time when water droplets were rolled was measured as the falling angle. When a water repellency film is used, the smaller the falling angle, the easier the water droplets are rolled, and the antifouling property is excellent and preferable.

[Outdoor Exposure Test]

The samples produced in the examples were each attached to an aluminum base material to produce a reflection device for solar power generation. The reflection device was installed in the Sahara Desert or an environment similar to the Sahara Desert such that the angle to the ground was 30°. When the reflectance was significantly reduced by dirt, the surface was washed with ion exchanged water while such a condition was maintained for one year. After that, the regular reflectance was measured under the above conditions. In addition, the regular reflectance after the film outermost surface was washed with a predetermined brush and water was measured similarly.

The evaluation results of each item are shown in Table 1.

TABLE 1

| | INITIAL REGULAR REFLECTANCE [%] | STEEL WOOL TEST, SCRATCH NUMBER EVALUATION | | CONTACT ANGLE [°] | |
|---|---|---|---|---|---|
| | | BEFORE XENON IRRADIATION | AFTER XENON IRRADIATION | BEFORE XENON IRRADIATION | AFTER XENON IRRADIATION |
| COMPARATIVE EXAMPLE 1 | 95 | 0 | 100 OR MORE | 100 | 40 |
| COMPARATIVE EXAMPLE 2 | 95 | 0 | 50 TO 60 | 99 | 89 |
| EXAMPLE 1 | 95 | 0 | 40 TO 50 | 98 | 95 |
| EXAMPLE 2 | 95 | 0 | 30 TO 40 | 99 | 98 |
| EXAMPLE 3 | 95 | 0 | 30 TO 40 | 99 | 98 |
| EXAMPLE 4 | 95 | 0 | 15 TO 25 | 101 | 100 |
| EXAMPLE 5 | 95 | 0 | 15 TO 25 | 100 | 100 |
| EXAMPLE 6 | 95 | 0 | 0 TO 5 | 102 | 101 |
| EXAMPLE 7 | 95 | 0 | 0 TO 5 | 102 | 100 |
| EXAMPLE 8 | 95 | 0 | 0 TO 2 | 102 | 100 |
| EXAMPLE 9 | 95 | 0 | 0 TO 2 | 102 | 100 |
| EXAMPLE 10 | 95 | 0 | 0 TO 2 | 102 | 100 |

| | FALLING ANGLE [°] | | FIELD TEST | |
|---|---|---|---|---|
| | BEFORE XENON IRRADIATION | AFTER XENON IRRADIATION | REFLECTANCE AFTER STANDING OUTDOORS [%] | REFLECTANCE AFTER STANDING OUTDOORS, BRUSH WASH CONDITION [%] |
| COMPARATIVE EXAMPLE 1 | 32 | 28 | 54 | 70 |
| COMPARATIVE EXAMPLE 2 | 32 | 29 | 55 | 78 |
| EXAMPLE 1 | 26 | 24 | 91 | 92 |
| EXAMPLE 2 | 20 | 25 | 93 | 93 |
| EXAMPLE 3 | 20 | 26 | 93 | 93 |
| EXAMPLE 4 | 22 | 21 | 94 | 94 |

TABLE 1-continued

| EXAMPLE 5 | 17 | 18 | 94 | 94 |
| EXAMPLE 6 | 14 | 14 | 95 | 95 |
| EXAMPLE 7 | 21 | 20 | 95 | 95 |
| EXAMPLE 8 | 20 | 20 | 95 | 95 |
| EXAMPLE 9 | 16 | 17 | 95 | 95 |
| EXAMPLE 10 | 20 | 20 | 95 | 95 |

As can be seen in the evaluation results shown in Table 1, various characteristics of the examples according to the present invention are more excellent than Comparative Examples.

In each of Comparative Examples 1 and 2, since an initial antifouling property is low, dirt was stuck to the surface in the outdoor exposure test. The dirt was not eliminated even if the surface was washed by water, so that the reflectance was significantly reduced. Moreover, since the weather resistance is poor, scratches were formed by the brush used when dirt was washed, so that the reflectance was reduced.

In Examples 1 to 10, although the antifouling property and the scratch resistance after the outdoor exposure test are slightly different from each other according to the weather resistance of the hard coat layer 8, a high reflectance can be kept in each example. It is considered this is because the three functions, the antifouling property, the scratch resistance, and the weather resistance can be provided by the hard coat layer 8 of the present invention.

Namely, the present invention can provide a film mirror 10 for solar power generation and a reflection device 20 for solar power generation, which prevent the reduction of the regular reflectance due to deterioration of the silver reflection layer 3, lightweight and flexible, can realize a large area and mass production while suppressing production cost, excellent in scratch resistance and antifouling property, and have a high level of such weather resistance that a good regular reflectance to sunlight can be maintained for a long period of time even when installed in a severe environment for a long period of time.

The application of the present invention is not limited to the above embodiments and can be appropriately modified without departing from the scope of the present invention.

INDUSTRIAL APPLICABILITY

Since the present invention has the above constitution, it can be utilized as a mirror and a reflection device for solar power generation.

REFERENCE SIGNS LIST

1 First resin base material (base material)
2 Anti-corrosion layer
3 Silver reflection layer
4 Anti-corrosion layer
5 Ultraviolet absorption layer
6 Adhesion layer
7 Second resin base material
8 Hard coat layer
10 Film mirror (mirror)
11 Sticky layer
12 Support base material
20 Reflection device for solar power generation

What is claimed is:

1. A mirror comprising:
a base material, and
a silver reflection layer;
wherein a hard coat layer is provided at an outermost surface layer of the mirror and the hard coat layer comprises a polyfunctional acrylic monomer and a silicon resin, and
wherein an ultraviolet absorption layer is provided between the hard coat layer and the silver reflection layer.

2. The mirror according to claim 1, wherein the polyfunctional acrylic monomer has an active energy ray reactive unsaturated group.

3. The mirror according to claim 1, wherein the base material is a resin base material and the mirror is a film mirror.

4. The mirror according to claim 1, wherein the polyfunctional acrylic monomer and the silicon resin are a resin material in which at least polyfunctional acrylate and/or polyfunctional methacrylate and polyorganosiloxane chain are cross-linked.

5. The mirror according to claim 1, wherein the hard coat layer comprises an ultraviolet absorbent.

6. The mirror according to claim 5, wherein the ultraviolet absorbent is a benzotriazole-based ultraviolet absorbent.

7. The mirror according to claim 6, wherein the benzotriazole-based ultraviolet absorbent is a compound represented by a following general formula (1):

[Chemical Formula 1]

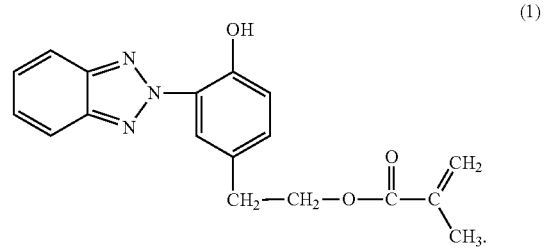

8. The mirror according to claim 1, wherein the hard coat layer comprises an organic-based antioxidant.

9. The mirror according to claim 1, wherein the hard coat layer comprises polyorganosiloxane.

10. The mirror according to claim 1, wherein a gas barrier layer is provided between the hard coat layer and the silver reflection layer.

11. The mirror according to claim 1, wherein an anti-corrosion layer is provided on a light incident side relative to the silver reflection layer.

12. The mirror according to claim 1, wherein at least two types of radical initiators are used as initiators for the hard coat layer, and the two types of radical initiators are radical initiators absorbing different wavelengths.

13. The mirror according to claim 1, wherein the mirror is a mirror for solar power generation.

14. A reflection device for solar power generation comprising the mirror according to claim 13, wherein the mirror is bonded to a support base material through a sticky layer.

* * * * *